(12) United States Patent
Cho et al.

(10) Patent No.: US 9,142,825 B2
(45) Date of Patent: Sep. 22, 2015

(54) ELECTRODE LEAD COMPRISING PROTECTION LAYER FOR ANTI-CORROSION AND SECONDARY BATTERY COMPRISING THE SAME

(75) Inventors: Seung Su Cho, Daejeon (KR); Seung Don Choi, Daejeon (KR); Ho Jin Jeon, Daejeon (KR); Dae Sik Choi, Daejeon (KR); Dae Hong Kwon, Daejeon (KR); You Rim Yoon, Daejeon (KR)

(73) Assignee: LG Chem, Ltd. (KR)

( * ) Notice: Subject to any disclaimer, the term of this patent is extended or adjusted under 35 U.S.C. 154(b) by 125 days.

(21) Appl. No.: 13/352,481

(22) Filed: Jan. 18, 2012

(65) Prior Publication Data

US 2012/0115023 A1  May 10, 2012

Related U.S. Application Data

(63) Continuation of application No. PCT/KR2011/007090, filed on Sep. 27, 2011.

(30) Foreign Application Priority Data

Sep. 27, 2010  (KR) .................. 10-2010-0093076

(51) Int. Cl.
*H01M 2/32* (2006.01)
*H01M 2/30* (2006.01)
*H01M 2/02* (2006.01)
*H01M 2/06* (2006.01)
*H01M 10/052* (2010.01)
*H01M 10/058* (2010.01)

(52) U.S. Cl.
CPC .............. *H01M 2/30* (2013.01); *H01M 2/021* (2013.01); *H01M 2/0212* (2013.01); *H01M 2/06* (2013.01); *H01M 2/32* (2013.01); *H01M 10/052* (2013.01); *H01M 10/058* (2013.01); *Y02E 60/122* (2013.01)

(58) Field of Classification Search
CPC ............ H01M 2/32; H01M 2/30; H01M 2/24
USPC ......................................... 429/161, 162, 179
See application file for complete search history.

(56) References Cited

U.S. PATENT DOCUMENTS 4,364,800 A * 12/1982 Partridge ...................... 205/122
5,834,133 A * 11/1998 Narukawa et al. ............ 429/171

(Continued)

FOREIGN PATENT DOCUMENTS

JP          11067281 A       3/1999
JP       2001-167752 A       6/2001

(Continued)

OTHER PUBLICATIONS

International Search Report for Application No. PCT/KR2011/007090 dated May 1, 2012.

*Primary Examiner* — Zachary Best
(74) *Attorney, Agent, or Firm* — Lerner, David, Littenberg Krumholz & Mentlik, LLP

(57) ABSTRACT

Provided are an electrode lead of a secondary battery where a protection layer for anti-corrosion is selectively formed at an electrode lead portion at the cell outside and a secondary battery including the same. Since a protection layer for anti-corrosion is selectively formed only on an electrode lead portion at the cell outside, the corrosion of the electrode lead may be prevented from an external environment and the resistance of a cell may be reduced simultaneously.

18 Claims, 2 Drawing Sheets

(56) References Cited

U.S. PATENT DOCUMENTS

| | | | |
|---|---|---|---|
| 7,892,675 B1* | 2/2011 | Tsukamoto | 429/211 |
| 2004/0137299 A1* | 7/2004 | Mazza et al. | 429/34 |
| 2005/0277018 A1* | 12/2005 | Kim | 429/120 |
| 2008/0032236 A1* | 2/2008 | Wallace et al. | 430/319 |
| 2009/0111011 A1* | 4/2009 | Kim et al. | 429/133 |
| 2009/0317717 A1 | 12/2009 | Ryu et al. | |
| 2011/0305945 A1* | 12/2011 | Tada et al. | 429/179 |

FOREIGN PATENT DOCUMENTS

| | | | |
|---|---|---|---|
| JP | 2003303583 A | | 10/2003 |
| JP | 2008027894 A | | 2/2008 |
| JP | 2009099527 A | | 5/2009 |
| JP | 2010-170979 A | * | 8/2010 |
| KR | 20070049553 A | | 5/2007 |
| KR | 2010008591 A | * | 1/2010 |
| KR | 20100016719 A | | 2/2010 |

* cited by examiner

ELECTRODE LEAD COMPRISING PROTECTION LAYER FOR ANTI-CORROSION AND SECONDARY BATTERY COMPRISING THE SAME

CROSS REFERENCE TO RELATED APPLICATIONS

This application is a Continuation of PCT International Application No. PCT/KR2011/007090 filed on Sep. 27, 2011, which claims the benefit of Patent Application No. 10-2010-0093076 filed in Republic of Korea, on Sep. 27, 2010. The entire contents of all of the above application are hereby incorporated by reference into the present application.

BACKGROUND OF THE INVENTION

This application claims priority of Korean Patent application No. 10-2010-0093076, filed on Sep. 27, 2010, the entire contents of which are hereby incorporated by reference.

The present invention disclosed herein relates to an electrode lead including a protection layer for anti-corrosion and a secondary battery including the same.

As technical developments and demands on mobile devices are increased, requirements for secondary batteries are drastically increased. Among the secondary batteries, a lithium secondary battery having high energy density and operating voltage and excellent life cycle is used as an energy source for various mobile devices and electronic products. Because of that, the lithium secondary battery receives great attention as an energy source for electric vehicles and hybrid electric vehicles and also is suggested as an alternative to resolve environmental pollution and global warming issues regarding typical gasoline and diesel vehicles using fossil fuel. Thus, some lithium secondary batteries are in a commercialization phase.

The secondary battery may be classified according to how an electrode assembly with a positive electrode/separation layer/negative electrode structure is configured. Typically, the secondary battery may include a jelly-roll type electrode assembly having a structure in which positive and negative electrodes having a long sheet shape are wound with a separation layer therebetween, a stack type electrode assembly having a structure in which a plurality of positive and negative electrodes cut by a predetermined sized unit are sequentially stacked with a separation layer therebetween, and a stack/folding type electrode assembly having a structure in which Bi-cells or Full-cells having stacked positive and negative electrodes of a predetermined unit with a separation layer therebetween are wound.

Recently, a pouch type battery having a structure in which a stack or stack/folding type electrode assembly is built in a pouch type battery case of an aluminum laminated sheet attracts a lot of attention due to low manufacturing costs, light weight, and easy reshaping and thus, its usage is extensively increased.

FIG. 1 is a mimetic diagram illustrating a typical structure of a pouch type lithium secondary battery.

Referring to FIG. 1, the pouch type lithium secondary battery 10 includes an electrode assembly 30, electrode taps 40 and 50 extending from the electrode assembly 30, electrode leads 60 and 70 welded to the electrode taps 40 and 50, and an exterior finishing material 20 receiving the electrode assembly 30.

The electrode assembly 30 is a power generating device where positive and negative electrodes are sequentially stacked with a separation layer therebetween and has a stack or stack/folding type structure. The electrode taps 40 and 50 extend from each electrode plate of the electrode assembly 30. The electrode leads 60 and 70 are electrically connected to the electrode taps 40 and 50 extending from each electrode plate through welding and are partially exposed to the external of the exterior finishing material 20. Additionally, in order to increase the degree of sealing and obtain an electrical insulation state simultaneously, an insulation film 80 formed of Polypropylene (PP) is attached to the top and bottom portions of the electrode leads 60 and 70. The exterior finishing material 20 is formed of an aluminum laminated sheet, provides a receiving space to receive the electrode assembly 30, and has an overall pouch shape.

Moreover, the electrode leads 60 and 70 require properties such as no reaction with an electrolyte and no corrosion in a unit cell, no external oxidation in air, and excellent adhesion to the insulation film 80 such as PP.

Especially, in order to prevent corrosion from external air or foreign substance, the electrode leads 60 and 70 are typically coated with a protection layer (not shown). In more detail, since the electrode lead 60 of copper material and the positive electrode lead 70 of aluminum material are oxidized easily and are vulnerable to corrosion, their external surfaces are plated with nickel. Typically, the negative electrode lead 60 of the lithium secondary battery 10 has a structure, in which a nickel thin film is added on the both sides of a copper plate, and is typically formed through a clad method of overlapping and rolling different metal plates at a high temperature to combine them Anyway, the protection layer serves to prevent the corrosion of the electrode leads 60 and 70 from an external environment of a cell and thus, establishes as an essential component in the electrode leads 60 and 70.

However, the protection layer has a relatively lower electrical conductivity than the electrode leads 60 and 70. Specifically, nickel has merely about 14.9% of an electrical conductivity of the negative electrode lead 60 formed of copper. Additionally, in relation to the welding surfaces of the electrode leads 60 and 70 and the electrode taps 40 and 50, direct contact areas between the electrode leads 60 and 70 and the electrode taps 40 and 50 are reduced due to the protection layer interposed therebetween. As a result, although the protection layer is necessary to prevent the corrosion of the electrode leads 60 and 70, it reduces electrical conductivity and electrical contact areas but serves as a resistance component of a cell.

Therefore, technical developments for preventing the corrosion of an electrode lead from an external environment and reducing the resistance of a cell simultaneously are required now.

SUMMARY OF THE INVENTION

The present invention provides an electrode lead including a selectively-formed protection layer for anti-corrosion through in-depth studies and diverse experiments. In this case, it is confirmed that the purpose of preventing the corrosion of an electrode lead is sufficiently achieved and the performance deterioration of a cell is prevented by reducing internal resistance simultaneously.

Embodiments of the present invention provide electrode leads of a secondary battery including: a protection layer for anti-corrosion formed selectively on only a portion of the electrode lead at a cell outside.

In some embodiments, the electrode lead may include at least one of a negative electrode lead and a positive electrode lead.

In other embodiments, the negative electrode lead may be formed of copper and the protection layer is formed of nickel.

In still other embodiments, the positive electrode lead may be formed of aluminum and the protection layer is formed of nickel.

In even other embodiments, the protection layer may be formed on one or both sides of the electrode lead.

In yet other embodiments, the protection layer may be formed through coating or plating.

In further embodiments, the plating may be electroplating.

In still further embodiments, the protection layer may have a thickness of about 0.1 nm to about 500 μm.

In other embodiments of the present invention, electrode leads of a secondary battery may include: no protection layer for anti-corrosion formed at a welding portion of the electrode lead and an electrode tap.

In still other embodiments of the present invention, secondary batteries include: an electrode assembly; an exterior finishing material receiving the electrode assembly; and the electrode lead of any one of the above connected electrically to the electrode assembly.

In some embodiments, the secondary battery is a lithium secondary battery.

In other embodiments, the secondary battery may be a pouch type lithium secondary battery including an adhesive film for insulation between the electrode lead and the exterior finishing material.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, the present invention will be described in more detail.

Figure 1:
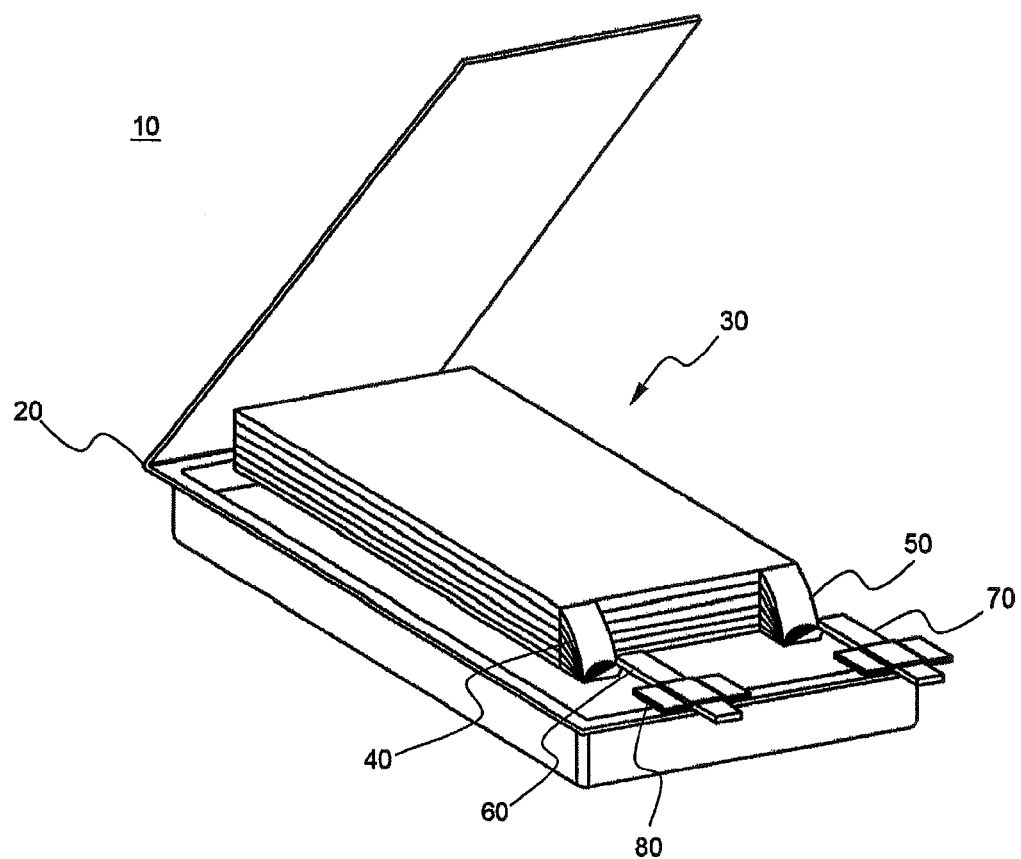
FIG. 1 is a mimetic diagram illustrating a typical structure of a pouch type lithium secondary battery.
Figure 2:
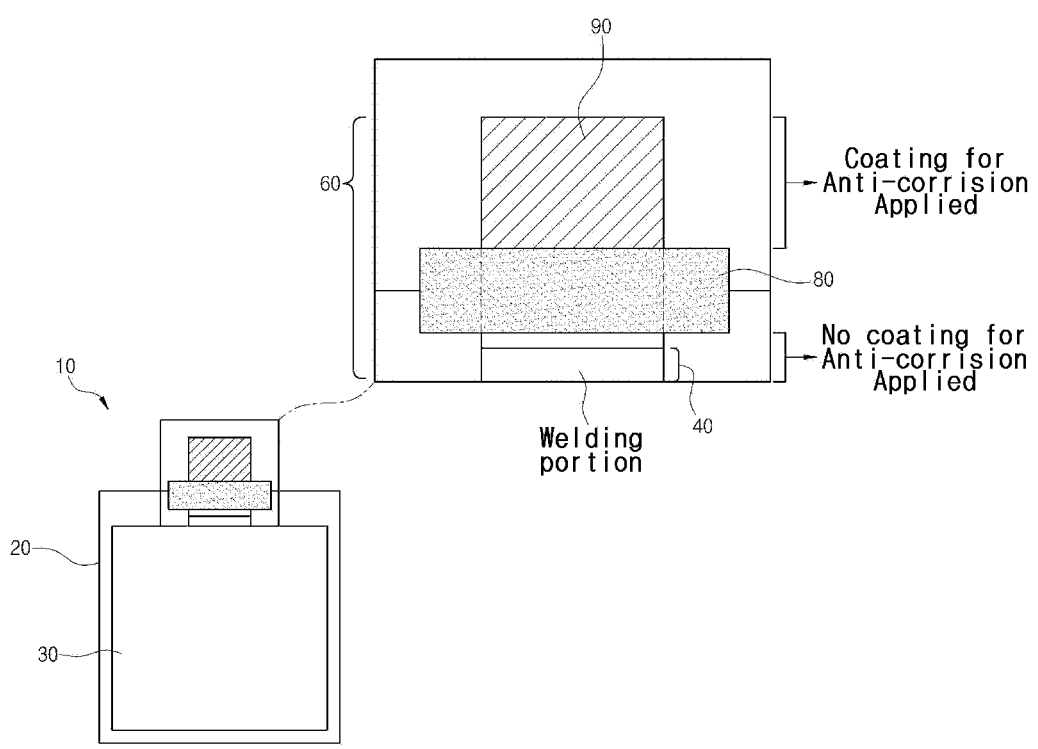
FIG. 2 is a mimetic diagram illustrating a electrode lead where a protection layer for anti-corrosion is selectively formed according to an embodiment of the present invention.

Referring to FIG. 2, according to the present invention, it is characterized that a protection layer for anti-corrosion is formed on an electrode lead in a secondary battery such as a lithium ion battery, and more specifically, is selectively formed on only a part of the electrode lead at the cell outside.

In a typical electrode lead, all portions thereof are coated with a protection layer for anti-corrosion, regardless of the outside and inside of a cell. Accordingly, although the purpose for the anti-corrosion is achieved, the protection layer causes low electrical conductivity and reduces a direct contact area between the electrode lead and an electrode tap, thereby increasing the internal resistance of the cell.

Therefore, according to the present invention, a protection layer is not formed on a portion of an electrode lead, the portion being disposed in a cell and thus being not exposed to external air and foreign substance with less corrosion possibility. However, a protection layer is selectively formed on only a portion of the electrode lead at the cell outside. In this case, the corrosion of the electrode lead is prevented from an external environment and its internal resistance is reduced simultaneously, so that electrical contact between the electrode lead and an electrode tap may be improved. That is, since a cell inner area of the electrode lead, which includes a portion where the electrode lead and the electrode tap are welded, may not be easily exposed to external air or foreign substance, forming the protection layer is omitted.

When taking a pouch type secondary battery as an example, "cell outside" and "cell inside" may be distinguished based on an insulation film according to the present invention. Since a portion contacting a sealing part of an exterior finishing material in an electrode lead is surrounded by an insulation film, it may be less corroded through an external environment. That is, based on a portion having the insulation film, the outer side may be designated as "cell outside" and the inner side having an electrode assembly received may be designated as "cell inside". The protection layer of the present invention is formed only on the "cell outside".

Moreover, according to the present invention, it is characterized in an electrode lead of a secondary battery that a protection layer for anti-corrosion is not formed on a welding portion of the electrode lead and an electrode tap.

Since a portion of the electrode lead, welded to the electrode tap, is disposed at the cell inside, it is sealed through welding and is not exposed to the external. Therefore, there is no need to form a protection layer. If a protection layer is formed on the welding portion like before, internal resistance is rather increased in the cell due to the low electrical conductivity of the protection layer and the reduced contact areas between the electrode lead and the electrode tap.

In more detail, if welding is performed with an electrode lead disposed at the lower or upper portion of an electrode tap, forming a protection layer on the welded surface of the electrode taps is omitted. Moreover, if welding is performed with an electrode lead inserted into an electrode tap, the electrode lead is welded and sealed between the electrode taps, so that there is no need to form the protection layer on and below the electrode lead.

By default, no protection layer is formed on the welding portion of the electrode lead and the electrode tap but a protection layer is formed on the cell outside portion of the electrode lead. However, a protection layer may be or may not be formed on a remaining portion except for the welding portions in the cell inside portions of the electrode lead. However, since external air and foreign substance are not completely prevented from entering into the cell inside, in an aspect of a definite anti-corrosion, a protection layer may be formed on a remaining portion except for the welding portion in the cell inside portions of the electrode lead.

Additionally, a selective protection layer according to the present invention may be formed on at least one of a negative electrode lead and a positive electrode lead. That is, a protection layer is formed on only the cell outside portion of the negative electrode lead and a protection layer may be formed on all the cell inside and outside portions of the positive electrode lead. Or, a protection layer is formed on only the cell outside portion of the positive electrode lead and a protection layer may be formed on all the cell inside and outside portions of the negative electrode lead. More preferably, a protection layer may be formed on only the cell outside portion of each of the negative electrode lead and the positive electrode lead, in order to reduce the resistance of a cell to the maximum.

Here, the negative electrode lead may be formed of copper and the protection layer may be formed of nickel. In this case, since nickel has just about 14.9% of the electrical conductivity of copper, this becomes a factor to increase the resistance of a cell drastically. Thus, it becomes more necessary to from a protection layer selectively according to the present invention. It is the same when the positive electrode lead is formed of aluminum and the protection layer formed of nickel.

Only if the protection layer of an electrode lead according to the present invention satisfies the above conditions, the thickness of the protection layer is not specifically restricted. However, the protection layer may be formed with a thickness of about 0.1 nm to about 500 nm in order to effectively protect the electrode lead and to prevent the electrode lead from becoming too thick.

Moreover, the selective protection layer according to the present invention may be formed on one side or both sides of the electrode lead. Additionally, the protection layer may be formed through coating or plating, and more specifically, may be formed through electroplating.

Furthermore, the present invention relates to a secondary battery including an electrode assembly, an exterior finishing material receiving the electrode assembly, and the above-mentioned electrode lead connected electrically to the electrode assembly.

Here, the secondary battery may be a lithium secondary battery, and more specifically, may be a pouch type lithium secondary battery including an adhesive film (i.e., an insulation film) for insulation between the electrode lead and the exterior finishing material.

Since general information about manufacturing a (lithium) secondary battery including an electrode assembly, an exterior finishing material, and an electrode lead and a pouch type lithium secondary battery is known to those skilled in the art, their detailed description will be omitted.

Hereinafter, the present invention will be described in more detail through an example.

Example

After a positive electrode active material containing lithium and a negative electrode active material containing graphite are applied on the both sides of an aluminum foil and a copper foil, respectively, a positive electrode plate and a negative electrode plate are manufactured by cutting the aluminum foil and the copper foil to have an electrode tap with no active material applied.

Next, after a positive electrode lead of aluminum material and a negative electrode lead of copper material are prepared, electroplating using nickel is performed on only the outside portions at the both sides of the negative electrode lead.

Next, after the manufactured positive and negative electrode plates are sequentially stacked using a separation layer, welding is performed while the positive electrode lead and the negative electrode lead are disposed below the positive electrode taps and the negative electrode taps, respectively, in order to complete an electrode assembly.

Next, after an exterior finishing material of a laminated sheet is manufactured by stacking an internal resin layer (i.e., a polyethylene film), a metal layer (formed of aluminum), and an external resin layer (i.e., a nylon film), a receiving part is formed through deep drawing and then the electrode assembly is received in the manufactured pouch type exterior finishing material in a dry room.

Next, after 1 M $LiPF_6$ carbonate-based electrolyte is injected, an insulation film surrounds the positive and negative electrode lead portions that contact a sealing part of the exterior finishing material, and then, the outer circumference of the exterior finishing material is sealed through thermo-compression, in order to manufacture a pouch type lithium secondary battery. (As a result, the nickel plating is formed on only the cell outside portion divided by the insulation film in the negative electrode lead and is not formed on the cell inside portion including a welding portion.)

Comparative Example

Except the fact that all portions at the both sides of the negative electrode lead are electroplated with nickel, it is the same as the example. (as a result, the nickel plating is formed on all the cell inside and outside portions of the negative electrode lead including a welding portion.)

Experimental Example

After a resistance measuring test was performed on each of the batteries manufactured in the example and the comparative example, its result was shown in the following Table 1. In this test, a measuring test for the output and resistance of a battery cell was used. More specifically, SOC (State Of Charge) was set with about 50 and 120 A AC was applied for about 10 sec in consideration of a property of the battery cell, and then a voltage difference was measured before and after current flowed in order to calculate the resistance of each electrode lead.

TABLE 1

| | Resistance (mΩ) |
|---|---|
| Example | 4.0 |
| Comparative example | 4.3 |

As shown in Table 1, in the case of the example, since nickel having low electrical conductivity was not included in the welded area of the negative electrode lead and the negative electrode tap, the resistance of a cell was measured low. On the contrary, in the case of the comparative example, since nickel having low electrical conductivity was included in the welded area of the negative electrode lead and the negative electrode tap, the resistance of a cell was higher than that of the example due to the reduced electrical conductivity and contact area.

That is, according to the present invention, since a protection layer for anti-corrosion is selectively formed on only a portion of an electrode lead at the cell outside, it is confirmed that the corrosion of the electrode lead is prevented from an external environment and the resistance of a cell is reduced to prevent the performance deterioration simultaneously.

According to the present invention, since a protection layer for anti-corrosion is selectively formed on only a portion of an electrode lead of a secondary battery at the cell outside, the corrosion of the electrode lead is prevented from an external environment and the resistance of a cell is reduced simultaneously.

The above-disclosed subject matter is to be considered illustrative, and not restrictive, and the appended claims are intended to cover all such modifications, enhancements, and other examples, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An assembly for a secondary battery comprising:
   more than one each of positive and negative electrode plates sequentially stacked with a separator therebetween;
   electrode tabs extending from each positive and negative electrode plate;
   positive and negative electrode leads electrically connected to and extending from said electrode tabs, wherein the positive and negative electrode leads have a cell inside portion and a cell outside portion distinguished based on an adhesive film for insulation, such that the cell outside portion is an outer side of each positive and negative electrode lead beginning at an outer edge of the adhesive film, and the cell inside portion is an inner side of each positive and negative electrode lead beginning at an inner edge of the adhesive film; and
   an anticorrosion protection layer formed selectively on only the cell outside portion of each positive and negative electrode lead, the anticorrosion protection layer covering the entire cell outside portion of each positive and negative electrode lead.

2. The electrode assembly of claim 1, wherein the negative electrode lead is formed of copper and the anticorrosion protection layer is formed of nickel.

3. The electrode assembly of claim 1, wherein the positive electrode lead is formed of aluminum and the anticorrosion protection layer is formed of nickel.

4. The electrode assembly of claim 1, comprising a coated or plated anticorrosion protection layer.

5. The electrode assembly of claim 4, wherein the anticorrosion protection layer is an electroplated layer.

6. The electrode assembly of claim 1, wherein the anticorrosion protection layer has a thickness of about 0.1 nm to about 500 μm.

7. A secondary battery comprising:
   the electrode assembly of claim 1; and
   an exterior finishing material receiving the electrode assembly.

8. The secondary battery of claim 7, wherein the secondary battery is a lithium secondary battery.

9. The secondary battery of claim 8, wherein the secondary battery is a pouch type lithium secondary battery comprising an adhesive film for insulation between the electrode lead and the exterior finishing material.

10. An assembly for a secondary battery comprising:
    more than one each of positive and negative electrode plates sequentially stacked with a separator therebetween;
    electrode tabs extending from each positive and negative electrode plate;
    positive and negative electrode leads electrically connected to said electrode tabs at a respective welding portion of each electrode lead, said electrode leads extending from said electrode tabs; and
    an anticorrosion protection layer formed on each positive and negative electrode lead, the anticorrosion protection layer covering the entire positive and negative electrode lead except for the respective welding portion.

11. The electrode assembly of claim 10, wherein the negative electrode lead is formed of copper and the anticorrosion protection layer is formed of nickel.

12. The electrode assembly of claim 10, wherein the positive electrode lead is formed of aluminum and the anticorrosion protection layer is formed of nickel.

13. The electrode assembly of claim 10, comprising a coated or plated anticorrosion protection layer.

14. The electrode assembly of claim 13, wherein the anticorrosion protection layer is an electroplated layer.

15. The electrode assembly of claim 10, wherein the anticorrosion protection layer has a thickness of about 0.1 nm to about 500 μm.

16. A secondary battery comprising:
    the electrode assembly of claim 10; and
    an exterior finishing material receiving the electrode assembly.

17. The secondary battery of claim 16, wherein the secondary battery is a lithium secondary battery.

18. The secondary battery of claim 17, wherein the secondary battery is a pouch type lithium secondary battery comprising an adhesive film for insulation between the electrode lead and the exterior finishing material.

* * * * *